Figure 1:
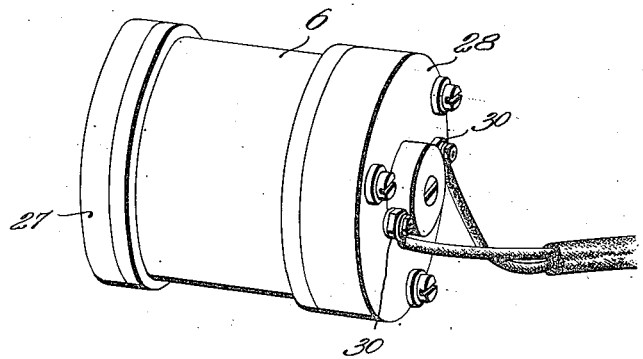

Oct. 16, 1945.  H. CARSON  2,387,223
VIBRATION PICKUP
Filed Feb. 6, 1943

Witness
Frederick S. Greenleaf

Inventor
Howard Carson
by his attorneys
Fish Hildreth Cary & Jenney

Patented Oct. 16, 1945

2,387,223

UNITED STATES PATENT OFFICE 2,387,223

VIBRATION PICKUP

Howard Carson, Dayton, Ohio, assignor to Research Corporation, New York, N. Y., a corporation of New York Application February 6, 1943, Serial No. 475,027

6 Claims. (Cl. 171—209)

The present invention relates to vibration pick-ups of the type operating on the seismographic principle, and more particularly to pickups useful for measuring vibrations at low frequencies.

Seismographic vibration pick-ups are used where no stationary reference point is available, and therefore find particular application in the measurement of vibrations on parts of airplanes in actual flight. Various types of such devices are available; for example, as described in the Bentley and Draper Patent No. 2,251,436. Considerable difficulty has been experienced, however, in constructing a pick-up which accurately measures the vibrations at low frequencies. By low frequencies are meant frequencies in the general range from 1 to 15 cycles per second.

Vibration pick-ups may be used to measure displacements, velocities, or accelerations. In any case, certain conditions must be met as described in a paper by Draper and Wrigley, entitled "An instrument for measuring low frequency accelerations in flight," published in the Journal of the Aeronautical Sciences for July, 1940, page 388. The theory there developed shows that the conditions for accurate measurement of displacement at low frequencies are particularly difficult to fulfill, since the undamped natural frequency of the unit should be not greater than one-half the lowest frequency of the exciting motion. Thus a device capable of measuring displacements with fair accuracy at a frequency of 10 cycles per second should have an undamped natural frequency not greater than 5 c. p. s.

The construction of a pick-up having such a low natural frequency has been found very difficult. In general the natural frequency may be reduced by increasing the mass of the seismic element and reducing the elastic coefficient of the spring elements. A point is reached, however, at which the increased mass cannot be properly supported by the weak springs. It is particularly difficult to support the seismic element against sidewise accelerations such as are introduced in making vibration measurements on aircraft in actual flight.

Another difficult factor in the design of a vibration pick-up for low frequencies is the presence of mechanical or "coulomb" friction. When the seismic element is actually in frictional engagement with a supporting element, coulomb friction prevents any relative motion between the elements until the acceleration of the member under test exceeds a certain minimum, after which the parts "break away." While this effect is unimportant for high frequency measurements, it introduces a serious uncertainty at low frequencies.

The principal object of the present invention is to provide a vibration pick-up having an extremely low natural frequency, and having substantially no mechanical friction. Further objects are to provide a pick-up of this type which is sensitive to motion in one direction only, and which is sufficiently rugged to withstand severe service in vibration testing.

With these objects in view, the present invention comprises the vibration pick-up hereinafter described and particularly defined in the claims.

Figure 2:
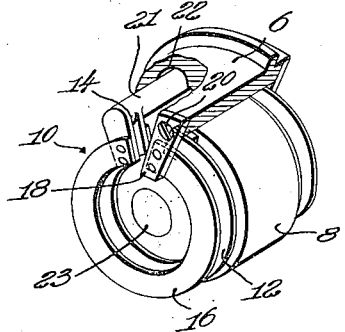
Figure 3:
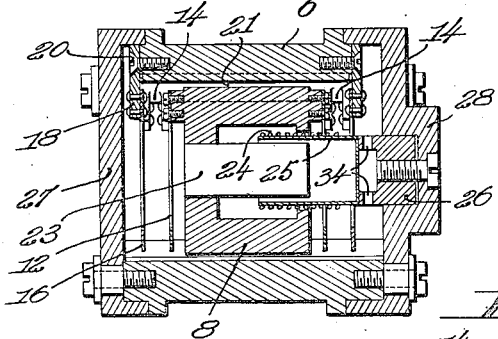
Figure 4:
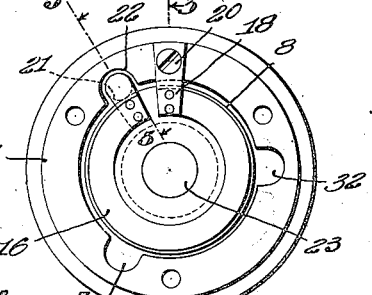
Figure 5:
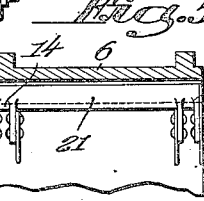

In the accompanying drawings, Fig. 1 is a perspective view of the pick-up according to the present invention; Fig. 2 is a perspective view, partly in section, of a portion of the device; Fig. 3 is a section on line 3—3 of Fig. 4; Fig. 4 is an end elevation with the end plate removed; and Fig. 5 is a detail view taken in section on line 5—5 of Fig. 4.

The pick-up shown in the accompanying drawing comprises a casing 6 of generally cylindrical form, enclosing a longitudinally movable seimographic element 8 which, as hereinafter to be described, is preferably constructed as a magnetic member for generating a voltage dependent on its velocity of movement. The element 8 is mounted for movement within the casing, but with a small clearance, preferably between 0.005" and 0.010".

In order to support the element 8 without possibility of rubbing contact with the casing, a spring mounting is provided at each end of the unit. As shown in Fig. 2, each mounting comprises a double split ring 10 of flat spring material, preferably steel or beryllium copper. One of the split rings 12 of each mounting member is attached at one end to the seismic unit and at the other end to a forked bracket 14. The other split ring 16 of the unit has one end also connected to the bracket 14 and its outer free end secured to a bracket 18, which in turn is received in a slot in the end face of the casing 6 and secured to the casing by a screw 20. The double split ring mountings are identical for both ends of the element. To prevent twisting of the brackets 14 under side loads, the brackets at opposite ends are connected together by a rigid rod 21 which is received in a longitudinal groove 22 of the casing with sufficient clearance to prevent rubbing contact therewith. The brackets 14 are preferably formed integral with the rod 21.

As shown in Fig. 3, the seismic element 8 comprises a cylindrical iron member and a central permanent magnet core 23. A coil 24 surrounds the end portion of the core 23, the coil being wound on an aluminum sleeve 25 secured to a plug 26. The casing is enclosed by end plates 27 and 28, the latter having a recess to receive the plug 26. Suitable electrical connections are brought out from the coil 24 to binding posts 30 on the end plate 28.

In addition to the groove 22 which accommodates the rod 21, the casing is provided with one or more longitudinal oil-flow grooves 32, for a purpose to be later explained. The casing is completely filled with a viscous damping fluid, preferably a light engine oil. The plug 26 by which the coil 24 is supported is provided with openings 34 to permit oil to flow therethrough.

The device having been described in detail, an explanation of its operation as a vibrometer (displacement-measuring instrument) will now be given.

One of the principal factors in reducing the natural frequency arises from the pumping of oil from one end of the casing to the other, mainly through the grooves 32. It can be shown theoretically that this pumping action produces an increase of the effective mass of the seismic element. Some viscous damping in the usual sense is also present, due to turbulence in the oil flow, and is necessary for dissipation of transients, but the principal useful effect of the oil is in the increase of effective mass. Thus the unit has an effective undamped natural frequency which is considerably lower than that indicated by the actual mass of the seismic element.

An important consideration is that the increase in effective mass, resulting from the oil pumping action, is in the axial direction only. The mass which the springs are required to support against sidewise movement is only the actual mass of the seismic element.

These considerations of increased mass are particularly important when the device is used as a vibrometer, where the effective undamped natural frequency should be not greater than one-half the lowest frequency of the exciting motion. Under this condition, if the damping of the system is between 50% and 80% of critical damping, the amplitude distortion is less than 10%, as shown by the theory developed in the Draper and Wrigley paper above referred to.

The increase of effective mass of the seismic element in the axial direction has an important advantage in the measurement of vibrations of large amplitude. It may be shown theoretically that in a vibrometer of conventional form, operated in the proper frequency range, the seismic element acts as a fixed reference point in space. In the present invention the seismic element does not remain fixed in space, but moves back and forth in the casing. For theoretical purposes, it may be shown that there is an equivalent spatially fixed member, composed of the seismic element itself together with the liquid medium, or a portion thereof, included in the clearance space around the seismic element. Practically, this means that the instrument may be used for measurement of amplitudes of vibration that exceed the amplitude range of the spring system.

The instrument is not limited to use as a vibrometer, but may be used as a velocimeter or accelerometer in the appropriate frequency range.

One important characteristic of the device, regardless of conditions of use or its natural frequency, is its sensitivity to motion in one direction only. The importance of this feature may be seen by considering vibration measurements on an airplane undergoing maneuvers, wherein side loads of considerable magnitude may be introduced. It has been found that side loading has no more than a negligible effect on the accuracy of measurement of the longitudinal motion. One effect of excessive side loading is to stress the springs with an accompanying tendency towards buckling, whereby in the longitudinal motion an unstable snapping from one side to the other may occur. It has been observed, however, that this result occurs only on side deflections of considerable magnitude and may be practically eliminated by maintaining a sufficiently small clearance between the seismic element and the casing, in combination with a damping medium to form a film which prevents rubbing contact between the seismic element and the casing. It has been found that the unstable snapping action in an instrument of the type described above does not occur until the sidewise accelerations are greater than 8 gravities.

Having thus described my invention, I claim:

1. Vibration measuring apparatus comprising a casing, a seismic element movable in one direction in the casing, spring supports for the seismic element, each including a plurality of flat split rings, bracket means for connecting the rings of each support, means securing the supports to opposite ends of the seismic element and to the casing, and a rigid member connecting the brackets of both supports.

2. Vibration measuring apparatus comprising a generally cylindrical casing, a cylindrical seismic element movable axially in the casing with slight clearance but out of contact therewith, a flat split ring of spring material for supporting each end of the seismic element in the casing, and a liquid medium in the casing, the casing being formed with grooves to cause liquid to be pumped from one end of the casing to the other upon relative movement between the seismic element and the casing, whereby the effective mass of the seismic element in the axial direction is increased.

3. Vibration measuring apparatus comprising a casing having a substantially cylindrical bore, a cylindrical seismic element mounted by means of a spring suspension system for axial movement within said bore, said element being shorter in axial dimensions than said bore to provide clearance between each end of the element and the casing, a liquid medium in the casing substantially filling the clearances between casing and element, and longitudinal channels providing communication between the clearances at opposite ends of the casing to permit liquid to be pumped through said channels upon relative movement between the seismic element and the casing, whereby the effective mass of the seismic element in the axial direction is increased.

4. Vibration measuring apparatus comprising a casing, a seismic element movable axially in the casing, and a spring support for the seismic element at each end thereof, each support having one end connected to the seismic element and the other end connected to the casing, each support having more than one convolution and being formed of flat spring material, and a rigid member inter-connecting corresponding points of each support intermediate the ends thereof, said member being movable relative to the casing and to the seismic element.

5. Vibration measuring apparatus comprising a casing, a seismic element movable axially in the casing, and a spring support for the seismic element at each end thereof, each support having one end connected to the seismic element and the other end connected to the casing, each support comprising a pair of flat split rings of spring material connected in series by a bracket, and a rigid member inter-connecting the brackets of each support, said member being movable relative to the casing and to the seismic element.

6. Vibration measuring apparatus comprising a casing, a seismic element movable axially in the casing, and a spring support for the seismic element at each end thereof, each support having one end connected to the seismic element and the other end connected to the casing, each support comprising a pair of flat split rings of spring material connected by a bracket in series but opposite-handed relation, and a rigid member interconnecting the brackets of each support, said member being movable relative to the casing and to the seismic element.

HOWARD CARSON.